No. 664,820. Patented Dec. 25, 1900.
J. A. PERKINS.
ROLLER BEARING.
(Application filed Dec. 1, 1899.)
(No Model.) 2 Sheets—Sheet 1.
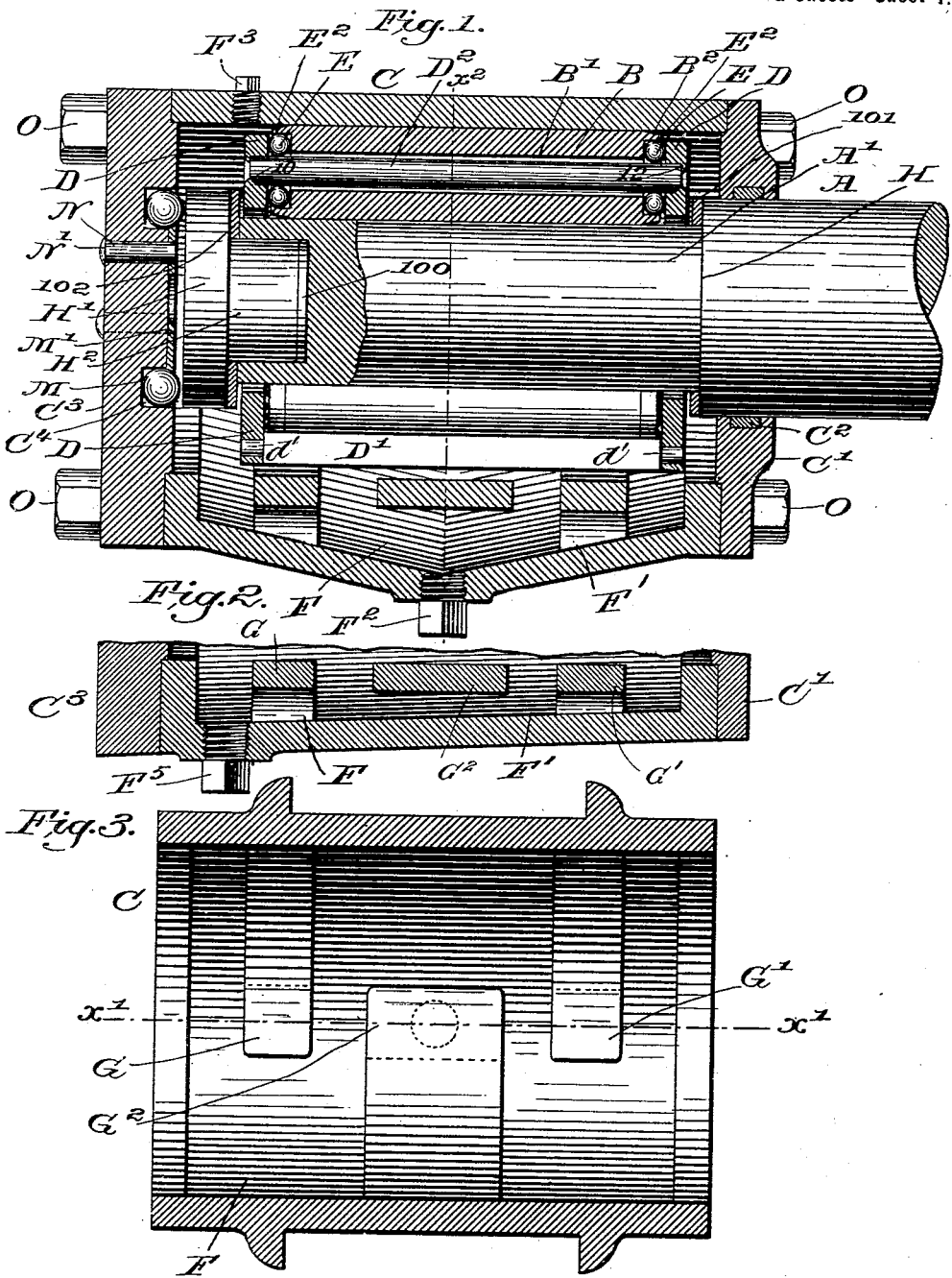
Witnesses.
Thomas J. Drummond,
Edward F. Allen.
Inventor.
Julius A. Perkins,
by Crosby & Gregory
attys.

No. 664,820. Patented Dec. 25, 1900.
J. A. PERKINS.
ROLLER BEARING.
(Application filed Dec. 1, 1899)
(No Model.)
2 Sheets—Sheet 2.
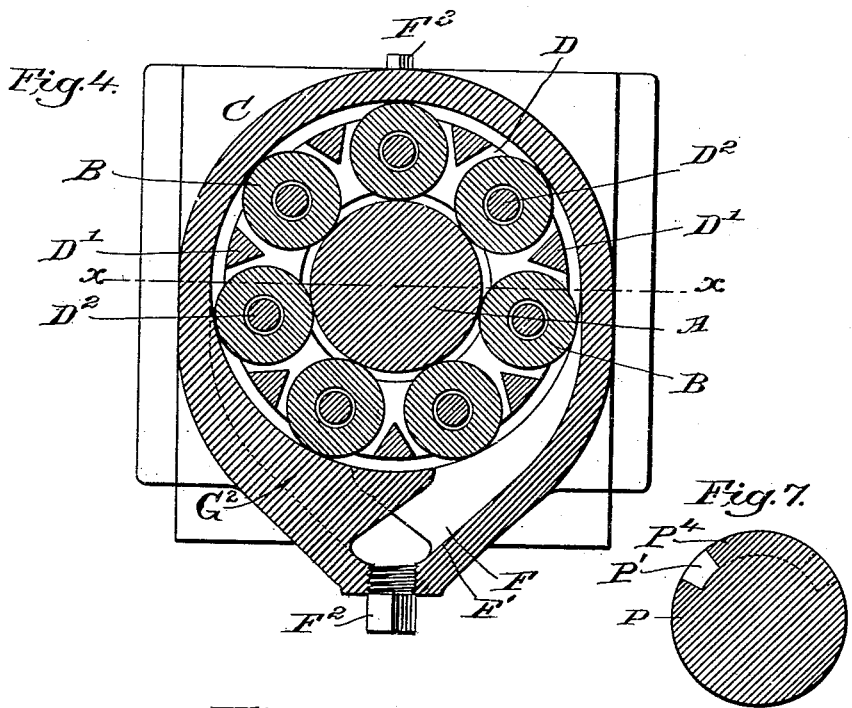
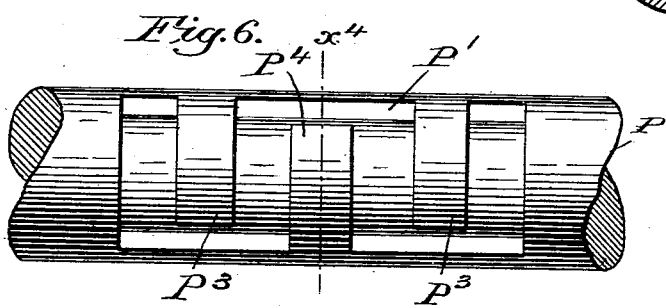
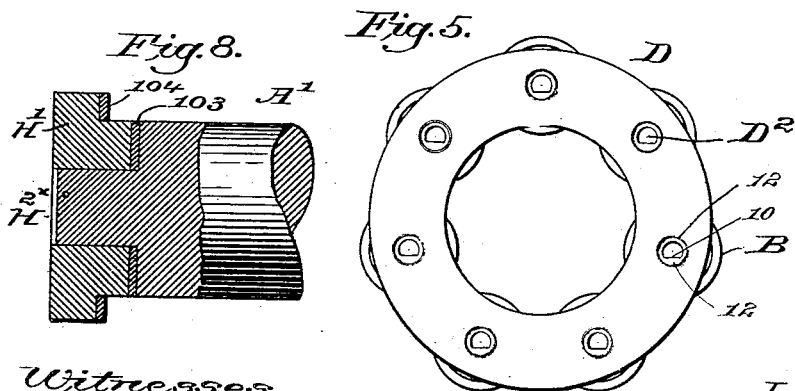
Witnesses.
Thomas J. Drummond
Edward F. Allen
Inventor.
Julius A. Perkins,
by Crosby Gregory
attys.

UNITED STATES PATENT OFFICE.

JULIUS A. PERKINS, OF OMAHA, NEBRASKA, ASSIGNOR TO THE MOFFETT BEARING COMPANY, OF COUNCIL BLUFFS, IOWA.

ROLLER-BEARING.

SPECIFICATION forming part of Letters Patent No. 664,820, dated December 25, 1900.

Application filed December 1, 1899. Serial No. 738,774. (No model.)

*To all whom it may concern:*

Be it known that I, JULIUS A. PERKINS, a citizen of the United States, residing at Omaha, county of Douglas, and State of Nebraska, have invented an Improvement in Roller-Bearings, of which the following description, in connection with the accompanying drawings, is a specification, like characters on the drawings representing like parts.

The invention to be herein described relates to roller-bearings of that type in which a series of bearing-rollers have a planetary movement between a box or hub and a journal or shaft, the rollers being preferably sustained and separated one from the other in a cage.

I have herein represented my invention as applied in a bearing for a railway-car wherein the journal rotates and the box is stationary; but my invention is equally well applicable to a roller-bearing in which the journal is stationary and the box rotates.

In my invention the rotating part of the roller-bearing with which the bearing-rollers coöperate has connected traveling-cage controllers or end guards, with which may contact at intervals under certain conditions the ends of the cage, said cage running for a greater portion of the time out of contact with the traveling-cage controllers, said controllers being on the journal when it rotates and on the box when it rotates.

In the form in which I have herein chosen to illustrate my invention, it being one of the best forms now known to me, the cage is composed of suitable end walls or rings united firmly and rigidly by cross-bars, the latter separating the cage into roller - receiving spaces, in which are suitably alined a series of bearing-rollers having a planetary motion between the box and journal and contacting at diametrically opposite points with the inner surface of the box and with the outer surface of the journal. These rollers are alined in the cage by non-rotatable axial supports, extending inwardly from the inner sides of the end walls of the cage and entering the ends of the bearing-rollers, said supports in one preferable form being represented as spindles extended through axial holes in the bearing-rollers, the holes in the rollers being sufficiently larger than the diameter of the axial supports as not to contact therewith in the operation of the bearing. The axial supports are fixed or made non-rotatable in or with relation to the end walls of the cage, and there is interposed between these non-rotatable axial supports and preferably the inner walls or chambers made in the ends of said bearing - rollers suitable antifriction means, which may be balls, which surround said axial supports and sustain the weight of the cage from the ends of the rollers, said antifriction means also by interposition between the ends of the bearing-rollers and the inner walls of the cage preventing any contact whatever between the ends of the rollers and the cage. The axial supports or alining means for the bearing-rollers (in practice for the best results composed of steel) are fixed in the cage, so that they cannot under any conditions of the bearing in use rotate them, and consequently the balls have a rigid and unvarying support in the planetary motion of the bearing-rollers.

The cage in the direction of the length of the bearing-rollers is sufficiently shorter than the distance between the traveling-cage controlling surfaces or end guards, or their acting faces of whatever material, to enable the cage when the bearing is in use and occupying a position between the box and the journal and also between said cage-controllers or end guards or their faces, of any material, to run freely between said faces without contacting therewith or with either the journal or the box, and consequently I designate said cage as a "floating" cage, it moving in the same direction with the traveling-cage controllers, but at a slower speed, said cage running normally freely in the open space between the faces of said traveling-cage controllers as a boat runs in a raceway, the cage sliding in the wider space between the faces of the traveling-cage controllers due, it may be, to the influence of gravity—as, for instance, should the surfaces of the journal or box when in action get out of true horizontal planes or should the surfaces of the rollers get out of parallelism one with relation to the other—and then in either case one or the other of the ends of said cage is liable to move toward and be struck by the faster-traveling cage-controller, the blow of said traveling surface against the end of the cage being sufficient to move the cage laterally in an opposite direction and return it again into its proper free-running position between the faces of the traveling-cage controllers.

When the traveling-cage controllers composed of metal strike against the metallic end walls of the cage, the blow of the cage-controller against the cage is quick, so that the metal faces do not cling together for a sufficient length of time to produce any perceptible wear either in the cage-controller or the end walls of the cage, yet to reduce the wearing of the roller-bearing to the minimum I have herein shown and shall in practice preferably interpose between the traveling-cage controllers and the ends of the cage non-metallic washers, preferably of vulcanite or equivalent material, applied so as to constitute acting faces for said cage-controllers, and should there be any wear in said washers they may be readily renewed, restoring the bearing to its original state of efficiency.

As one good form of fixing the axial supports about which the bearing-rollers revolve when said supports are represented as spindles I may provide the ends of the spindles with faces or portions other than round and may spin or inturn the metal of the cage surrounding the ends of the spindles located in alined holes in the cage, the ends of the spindles not extending to the outer faces of the cage, the material so spun or inturned and entering said holes forming an abutment which by contact with the ends of the spindles retains the spindles from rotation in the cage and also restrains all longitudinal motion of the spindles in the cage, and spindles so held and locked may be easily punched or driven out and replaced whenever desired. This invention is not, however, herein limited to the precise construction of the supports or centering means represented in Figure 1, and instead I may employ any other usual or suitable non-rotatable centering or alining means shaped to sustain a series of balls acted upon externally by a part of the bearing-roller at its end, and so, also, this invention is not limited in all instances to the exact construction of the antifriction means interposed between the rollers and the inner sides of the cage and surrounding the centering means, and instead I may employ any other usual or suitable antifriction means.

The bearing-rollers alined in the cage sustain the weight of the load, and in action said rollers simply roll or have a planetary motion between the inner surface of the box and the outer surface of the journal, and this movement is without the production of friction, and by the interposition of the antifriction means between the rollers and the cage and the centering devices and the rollers the ends of the rollers may in their rotation run without rubbing friction against the cage or against the centering means.

The bearing-rollers in one preferred form of my invention herein represented have chambers or countersinks made in their opposite ends, so that the ends of the rollers present flanges, and antifriction means referred to enter said chambers and contact with the inner sides of the flanges at the ends of the rollers.

Commonly the peripheries of end flanged bearing-rollers at each end have contacted with both the inner surface of the box and the outer surface of the journal, and as a result of this contact it has been found that the continued hammering of the flanges in the line of their contact with the balls and between the balls and the inner surface of the box and the outer surface of the journal results not only in crystallizing the flanges at the ends of the rollers, but also owing to the endwise motion of the rollers between said box and journal the ends of the rollers in the long use of the roller-bearing wear a sort of groove both in the box and the journal, and hence to obviate this crystallization of the flanges of the rollers and also the wearing of the grooves in the surfaces referred to I have provided for a free space between the rollers at their ends and the inner surface of the box and the outer surface of the journal opposite the flanged ends of the rollers, so that under no conditions can said flanged ends meet or contact with either the surface of the box or of the journal, and preferably I provide this space by reducing the diameter of the rollers at their ends at and about the flanges. In this way by relieving the flanges so that they do not contact at their exteriors with anything it is possible to run the rollers for any desired length of time and yet maintain the flanges in original working condition.

A roller-bearing of the class herein specified does not need oil to enable it to run freely, yet in practice to prevent rust of the operative parts of the bearing it is necessary to grease the surfaces over or with relation to which the bearing-rollers travel, and it is also understood that dust cannot be entirely excluded from the box, and dust uniting with the grease forms a residuum, which, if allowed to accumulate upon the surfaces of the bearing-rollers, tends to throw them out of parallelism with relation to the inner surface of the box and the outer surface of the journal, so that for the best results this residuum must be taken care of and the bearing-rollers must have their surfaces kept clean and unobstructed. Should this residuum be allowed to accumulate, the rotation of the bearing-rollers might be entirely obstructed, which would render the bearing in a short time inoperative. To care for this residuum as produced, a receptacle or pocket has been provided, and said receptacle in practice will be so located with relation to the box and journal that the residuum under the action of gravity may drop from the rollers and enter the receptacle, and preferably if the journal rotates it will be made in the box, and if the box rotates it will be made in the journal, and the receptacle will preferably be made in said box or in said journal at a point where the pressure of the load being carried is least.

The rollers are freed from any accumulations thereon, as stated, by gravity, and to enable gravity to so act the peripheries of the rollers in each complete cycle of their movement must be exposed over the receptacle, and consequently the receptacle for the best results should be of a length in the direction of the longitudinal axis of the journal somewhat in excess of the length of said bearing-rollers; but the receptacle, instead of being one large open space, is broken up by bearing surfaces or faces to present an irregular space or spaces, said spaces being between the faces, said faces occupying a position in substantially the circle of the inner bearing-surface of the box or the exterior bearing-surface of the journal, whichever has the receptacle made in it, that said bearing-rollers in their planetary motion may never be wholly without support, for should they enter a large receptacle the said rollers running at a high speed would, due to centrifugal action, unduly wear not only the centering means, but the balls and the flanges at the ends of the rollers, and as the rollers emerge from the receptacle they would strike against a shoulder at the farther side of the receptacle, which in the rapid running of a bearing would exert a blow that would be excessively injurious to the bearing-roller and would strain and wear not only the flanges of the rollers, but the balls and the centering means and the cage construction, and consequently the need of the receptacle presenting surfaces or faces to always contact with some portion of each roller as it passes the receptacle.

The surfaces at and about the receptacle which constantly sustain the rollers when crossing the receptacle are so located each with relation to the other that each bearing-roller in crossing the receptacle will have one or another portion thereof exposed that any particles collected upon or carried by the roller at its unexposed part may by gravity enter the receptacle, the object being that substantially all parts of each roller be exposed to an open part of the receptacle during the time occupied by each roller in crossing the receptacle. In order that the residuum dropping into the box may be so collected and that it may be readily washed out or removed, I preferably form the lower side of the box as an incline and I provide the box at its bottom and top with suitable plugs which when removed will enable a liquid to be run through the box to cleanse it and the bearing-rollers and the journal.

I have provided suitable end thrust means to reduce the friction resulting from the contact of the end of the journal with the end of the box, and in the form in which my invention is herein embodied, the journal rotating, I have made one of the traveling-cage controllers detachable from the journal, and I have interposed between said journal and said detachable-cage controllers a suitable washer, preferably of non-metallic material.

In the accompanying drawings, illustrating one practical form of this invention, Fig. 1 shows in vertical section a roller-bearing supposed to be adapted for use in railway-car construction, the box being stationary and the journal rotating, the end of the journal being broken out to represent the construction of the detachable or traveling-cage controller represented as applied to the rotating journal. Fig. 2 shows a modified form of the lower part of the box and its receptacle, the section being a longitudinal section. Fig. 3 is a section in a horizontal plane taken through the box to show its under side and the receptacle therein with its surfaces to maintain contact with the bearing-rollers. Fig. 4 is a section of the bearing shown in Fig. 1 on the dotted line $x^2$. Fig. 5 is an end view of the cage removed from the journal and box. Fig. 6 shows a modification of my invention as regards the receptacle for dirt and refuse. Fig. 7 is a section of Fig. 6 in the dotted line $x^4$; and Fig. 8 represents part of the journal, showing a different way of detachably applying the traveling-cage controller to the journal supposed to be rotative, as in Fig. 1.

A represents a journal supposed to be rotative, it having a surface A', said journal being represented as the journal of a railway-car; but it may be any journal or any part of a rotative shaft.

The box or stationary member C surrounds the journal A, and the journal receives about it a series of suitable bearing-rollers B of any desired number, I having herein chosen to represent seven such rollers. (See Figs. 4 and 5.) These bearing-rollers are represented as bored throughout from end to end, as at B', and the ends of the rollers are provided with countersinks or chambers, leaving at the ends of the rollers flanges $B^2$, which do not contact with either the box or journal, a space being left outside the flanges by reducing the flanges in diameter.

The bearing-rollers B are shown as alined and so maintained in spaces of a suitable cage composed of rings D, united firmly by suitable arms or cross-bars D', fixed or held rigidly at their ends to said rings to thus make of the rings and arms or bars a rigid cage, the bars separating the cage into roller-receiving spaces. The opposite ends of the cage are provided with bores through and through which aline one with the other, and as I have chosen to illustrate my invention in Fig. 1 the bores receive centering or alining means, represented as spindles $D^2$, which are provided, as represented, at their opposite ends with surfaces 10, (shown at the left in Fig. 1,) and the ends of the spindles terminate in the bores of the cage and at a point within the outer side walls of the cage, and the spindles are retained against longitudinal motion in the cage, and they are also fixed so that they cannot rotate in the cage by means of suitable abutments, as 12, made by upsetting portions of the cage to meet the ends of the spindles.

It is essential for the best operation of a roller-bearing that the centering means should not rotate and that said centering means be rigidly and immovably fixed in the cages.

The spindles $D^2$ are of enough smaller diameter than the bores $B'$ in the rollers B that said rollers in their rotation cannot contact with the centering means.

The chambers in the ends of the rollers are of a diameter greater than the bores through the rollers, and said chambers within the flanges receive antifriction devices, preferably balls E, said balls contacting with the inner walls of the flanges and with the inner sides of the cage and running in the rotation of the rollers and in contact with said centering means.

The antifriction means acts to prevent contact of the ends of the rollers with either the centering means or the cage.

In the use of bearing-rollers having flanges at their ends which are sustained at their inner sides by balls, said flanges contacting with the inner surface of the box and the exterior surface of the journal, it has been found that the balls E in rotating about the supports hammer the flanges running at their exterior in contact with the inner surface of the box or the outer surface of the journal, and such hammering results in crystallizing the flanges, so that they readily disintegrate or break down, thus destroying the usefulness of the bearing.

By providing the spaces $E^2$ between the exterior of the flanges of the rollers and the interior of the box and the exterior of the journal I have overcome the difficulty of crystallization of the flanged parts of the rollers, and these spaces as herein embodied are made by reducing the external diameter of the flanged parts of the rollers.

The bars or arms $D'$, employed to connect the end walls of the cage, are represented as provided with tenons $d'$, which enter suitable holes made in the cage ends and are there fixed by upsetting, swaging, or in any other convenient manner.

In Figs. 1 to 4 the lower part of the box is provided with a receptacle F for refuse or residuum composed of grease and dust, as specified, which may collect in the box in the operation of the roller-bearing, and the bottom of this receptable is preferably tapered somewhat, as at $F'$, said taper leading to a suitable outlet closed by a plug $F^2$, so that when said plug is removed kerosene or any other liquid inserted in an opening at the top of the box, which may be exposed by removing a plug $F^3$, may flow through the box and wash from the surface of the bearing-rollers and the journal any refuse which may be accumulated thereupon.

In practice it has been found that dust commingling with the grease or oil used to prevent the bearing from rusting when not in operation will, if not cared for, so accumulate upon the surfaces of the bearing-rollers as to throw them out of parallelism with relation to the surface of the journal with which they contact or will so clog the said rollers that they will not rotate, and in either instance this accumulation of refuse is injurious to the bearing; but by providing the refuse-receptacle and so locating it with relation to the box or the journal that any refuse particles accumulating upon the rollers may, due to gravity, drop from said rollers and enter said receptacle it becomes possible to run a roller-bearing for an indefinite time without taking it apart to cleanse it.

As represented in Figs. 1, 3, and 4, the box is provided with the receptacle F, and said receptacle is crossed by a plurality of suitable supports or faces, as G $G'$ $G^2$, they occupying such position in the path of circular movement of the bearing-rollers that said rollers are at all times sustained uniformly in their planetary movements. By providing a series of these supports extending more or less across the receptacle, an irregular-shaped receptacle is formed and the supports sustain at all times some part of each bearing-roller in its planetary motion about the journal, and said surfaces are so located one with relation to the other that substantially the entire surface of each bearing-roller is exposed at some time during its planetary motion opposite a space of the receptacle that any particles accumulated thereon may obey gravity and drop therefrom into the receptacle.

The supports G $G'$ $G^2$ in Figs. 1 and 3 are represented as crossing the axis of rotation of the journal at right angles; but said surfaces may be arranged in any line, so long as they act to continually sustain the rollers and leave spaces between them in which the refuse matter may drop by gravity.

The receptacle F is represented as of a length greater than the length of the bearing-rollers, and were it not for the supports it will be obvious that the bearing-rollers in the rapid movement of the cage containing the bearing-rollers would enter said receptacle due to centrifugal action and would unduly wear not only the flanges, but the balls and the centering means, and so, also, when said rollers cross the receptacle they would meet the opposite edge thereof and would strike said edge with a hard blow, which would not only wear but greatly strain the rollers, the balls, and the centering means. So for the greatest efficiency of the bearings one or the other of the plurality of the supports at the sides of the spaces constituting the receptacle F must always act against and keep the peripheries of the bearing-rollers in their proper running line.

As the journal A rotates its shoulder H constitutes a traveling-cage controller, and said journal has a second traveling-cage controller, (represented by a detachable end piece H',) said end piece being detachable from the journal in order that the cage and its bearing-rollers may be readily applied to the journal and put in position between the journal and the interior of the box C.

The detachable traveling-cage controller H' is applied to the journal by means of a tenon, the tenon in Fig. 1 being on the cage-controller and entering a socket in the journal; but this traveling-cage controller might have a hole through it, as represented in Fig. 8, and a tenon, as $H^{2\times}$, might project from the journal A and enter the hole of said cage-controller.

The face of the traveling-cage controller H and of the cage-controller H' are each provided with a non-metallic washer, as 101 and 102, said washers being preferably of vulcanite or its well-known substitutes, and the distance between the exposed faces of the non-metallic washers is greater than the length of said cage, so that said cage in running may occupy a position, as represented in Fig. 1, with its ends out of contact with either antifriction-washer, and said cage may in operation run freely in the space between the faces of the non-metallic washers without contacting therewith, the faces of said washers constituting the side walls of a raceway in which the cage may move freely without contact therewith except when for any reason the cage is caused to move lengthwise of the journal, in which event the cage, rotating in the direction of movement of the traveling-cage controllers, but at a slower speed, will slide endwise between the faces of the non-metallic washers and will meet one or the other of said washers, and they, traveling at a faster speed, will strike the end of the cage with a blow sufficient to quickly restore said cage into its free-running position.

It will be obvious that this invention would not be departed from should I omit the non-metallic washers and should the ends of the cage meet the traveling-cage controllers composed of metal, yet the employment of the non-metallic washers is of the greatest benefit, because by their use the cage and the traveling-cage controllers are rendered practically indestructible and any wear which may be apparent in the roller-bearing by long-continued use may be readily compensated for by supplying new non-metallic washers.

In applying the detachable traveling-cage controller to the rotating journal I also prefer to interpose between the said cage-controller and the end of the journal antifriction means which in Fig. 1 is the non-metallic washer or buffer 102; but in the modification Fig. 8 the non-metallic washer of Fig. 1 is divided in two parts 103 and 104.

The detachable traveling-cage controller H' performs in the present embodiment of this invention an additional function—that is, the outer face of said surface impinges against suitable antifriction means in overcoming friction due to end thrust, and said antifriction means for good results may be balls M, arranged in an annular groove $C^4$, made at the inner face of the head $C^3$ of the box, said antifriction means occupying a position, as represented, without the axial center of the journal, said balls being retained in said annular groove by means of a keeper, represented as a plate M', having a plurality of connected studs N, which are extended through holes in the face of the box and there rigidly fixed in position, preferably, by upsetting the ends of said studs, the exterior of said plate M' somewhat overlapping one wall of the groove $C^4$ and contacting with the balls to keep them in said groove.

The outer face of the detachable controller H' contacts with the balls $C^4$ only when the journal slides longitudinally in the box or the box slides on the journal, and to cover this feature broadly I shall use in the claims the term "slide relatively in a line longitudinal of the axis of the journal," I thereby intending to cover the sliding of either with relation to the other.

The opposite or inner end of the box C' may and will in practice have preferably some suitable form of dust-guard or packing, as $C^2$, not herein claimed as novel.

The box C may be of any usual shape and material, and its different parts may be suitably united by bolts, as O.

I believe that I am the first to provide a roller-bearing containing a plurality of bearing-rollers rotatable in a rigid traveling cage and alined in said cage by centering means non-rotatable in said cage with traveling-cage controllers the faces of which are separated from each other for a distance greater than the length of the cage, and I also believe that I am the first to provide either a stationary box or a stationary journal with which coöperates a series of bearing-rollers with a receptacle to receive refuse which may form in the bearing during its operation, and consequently I desire to claim this receptacle broadly and in whatever shape it may be made, said receptacle being in all instances so located either in the box or in the journal that refuse dropping from the peripheries of the rollers at their faces exposed above the spaces may by gravity enter the receptacle.

In the modification shown in Fig. 6, it showing a journal P, supposed to be fixed, the receptacle P' is represented in the upper side of the journal, and the said receptacle is made to present a series of pockets by the interposition of the surfaces $P^3$ $P^4$, the acting faces of said surfaces occupying a position in the circle defined by the exterior portion of the journal. Preferably this receptacle when made in the box will be at the lower side of the box and when made in the stationary journal will be made in the upper side of the journal, the receptacle thus being placed at points where the pressure of the load is least upon either the box or the journal, whichever contains the receptacle, the receptacle being, however, always either in the box when stationary or in the journal when stationary.

In some instances hardened-steel balls within the flanges of the bearing-rollers crystallize by the hammering action referred to and disintegrate and enter the bearing; but the crystallization of the flanges is obviated by providing the space $E^2$, hereinbefore referred to, between the exterior flanged end of the rollers and the inner surface of the box and the outer surface of the journal over which the bodies of said bearing-rollers travel.

The great object to be attained in the construction of roller-bearings is to maintain the most complete alinement possible of all parts of the bearing with the axial center of the journal, and if this alinement can be made and maintained substantially perfectly the bearing would become practically indestructible. Hence it will be seen that the effectiveness and durability of the bearing depend upon the more or less perfect alinement of the parts, and in the production of my novel bearing I have aimed to secure such alinement to the highest degree and maintain said alinement.

By the term "fixed" as applied to the spindles or roller-alining means in this application I mean "non-rotating."

Having described my invention, what I claim as new, and desire to secure by Letters Patent, is—

1. A roller-bearing consisting of a plurality of bearing-rollers, a rigid traveling roller-carrying cage, non-rotatable supports to aline said rollers, antifriction means interposed between said supports and said rollers and traveling-cage controllers outside of and separated from said cage.

2. A roller-bearing containing a plurality of bearing-rollers, a rigid traveling alining-cage containing said rollers and having non-rotatable means to aline said rollers in said cage, antifriction means interposed between the ends of said rollers and the cage and between the rollers and the supports whereby contact of the rollers with said cage and support is prevented, and traveling-cage controllers located outside of and separated from the ends of said cage.

3. A roller-bearing containing a plurality of bearing-rollers, a rigid traveling roller-alining cage having non-rotatable axial supports to center and aline the respective rollers, and traveling-cage controllers outside of and separated from said cage.

4. A roller-bearing containing a plurality of bearing-rollers, a rigid traveling alining-cage containing said rollers and having non-rotatable axial supports to center and aline said rollers in said cage and about which said rollers revolve, antifriction means interposed between the ends of said rollers and the cage and between the rollers and the axial supports, whereby contact of the rollers with said cage or supports is prevented, and traveling-cage controllers located outside of and separated from the ends of said cage.

5. A roller-bearing containing a plurality of bearing-rollers having flanges at their ends, a rigid traveling alining-cage, a series of non-rotatable supports extended from said cage to center and aline said rollers in their rotation about said supports as the cage travels, a series of balls acting against the inner sides of the flanges at the ends of said rollers and rolling over the side walls of the cage and the peripheral surface of said supports, and traveling-cage controllers supported at a distance from the ends of said cage sufficient to enable the cage to run freely between said traveling controllers and without contact therewith.

6. In a roller-bearing, a box, a journal contained in said box, and a rigid traveling alining-cage interposed between the surfaces of the box and of the journal, a series of bearing-rollers contained in said cage, non-rotatable roller-supports extended from said cage to center and aline said bearing-rollers, traveling-cage controllers located outside of and separated from the ends of said cage, one of said cage-controllers being detachably mounted upon the part carrying it that it may be removed to permit the cage to be put in position to surround the journal.

7. In a roller-bearing containing a plurality of bearing-rollers, a rigid traveling cage containing non-rotatable axial supports to aline and center said bearing-rollers, and traveling-cage controllers separated from the ends of said cage for a distance sufficient to enable said cage to rotate freely and also to slide longitudinally in the space between said cage-controllers and a non-metallic facing for and moving with said traveling-cage controllers, said facings occupying a position distant from each other more than equal to the length of the traveling cage in the direction of the length of its bearing-rollers, whereby said cage may slide longitudinally of the axis of the journal and contact at intervals with one or the other of said facings.

8. In a roller-bearing, a box, a journal, and a rigid traveling cage containing a plurality of bearing-rollers flanged at their ends, supports carried by said cage to aline said rollers, a series of balls coacting with the inner sides of said flanges and sustained by said supports, the exterior of said flanges in the planetary motion of the bearing-rollers being unsupported by either the box or the journal to thereby obviate the hammering of said flanges.

9. A roller-bearing composed of a box, a journal in said box, a rigid traveling alining-cage surrounding said journal and having a series of supports to center and aline said bearing-rollers, the extremities of said rollers being flanged at their ends and being reduced in diameter outside said flanges, a series of balls contained in said chambers and contacting with the interiors of the flanges at the ends of the bearing-rollers and with the inner side walls of the cage and with the said supports, and traveling-cage controllers separated from the ends of said cage, whereby said rollers may be run without crystallization of the flanges, as described.

10. In a roller-bearing, a box having at the inner side of its outer end antifriction end-thrust means, a rotating journal provided with cage-controllers, one of which is detachably applied to said journal by a tenon on one entering a hole in the other, said detachable controller meeting the end-thrust means as the journal slides in the box.

11. In a roller-bearing, a box having at the inner side of its outer end an annular groove, a series of balls located in said groove, a keeper applied to the inner side of said box end and partially overlapping the groove and the balls to retain them in said groove, said keeper having a connected shank extended through a hole in the box and rigidly secured in place at the outer side of the box by a head formed upon said shank.

12. A rigid cage containing a series of supports, a series of bearing-rollers alined or centered by said supports, antifriction means interposed between the ends of said rollers and the inner sides of the ends of the cage and of said supports, said rollers being reduced in diameter at their outer ends at a point outside the location of said antifriction means.

13. A roller-bearing containing a plurality of bearing-rollers, a rigid traveling cage, bearing-rollers in said cage, centering means sustained by said cage and about which said rollers may turn in the revolution of the cage about the journal, and faster traveling controllers movable with said cage in the same direction and adapted to strike said cage at intervals and move it into its free-running position.

14. In a roller-bearing, a box, a journal, a series of bearing-rollers interposed between the box and the journal and having a planetary motion between said box and journal, and a refuse-receptacle presenting a cross-support to sustain portions of said rollers while crossing said receptacle, different portions of said rollers being exposed in crossing the receptacle that particles carried by the rollers may descend by gravity and enter said receptacle.

15. In a roller-bearing, a box, a journal, a series of bearing-rollers interposed between the box and journal and having a planetary motion between said box and journal, and a refuse-receptacle extended over a space of greater length than the length of the bearing-rollers, said space presenting at suitable intervals roller-supports to insure the traveling of the rollers in the proper circular path, said rollers in their planetary motion exposing different portions of their surfaces opposite the openings that particles carried by the rollers may leave the rollers due to gravity and enter the receptacle.

16. In a roller-bearing, a box and a journal, one stationary and the other movable, an interposed cage revoluble between said box and journal, said cage being provided with bearing-rollers, the box or journal, whichever is stationary having a refuse-receptacle presenting within it a support to be met by the periphery of each bearing-roller in the traveling motion of the cage as said bearing-roller crosses said receptacle.

17. In a roller-bearing, a box, a journal, a rigid traveling cage located within said box and surrounding said journal and provided with a plurality of bearing-rollers sustained and alined in said cage, and a stationary refuse-receptacle of a length greater than the length of the rollers, and a plurality of roller-supports to sustain said rollers in their travel across said receptacle, said surfaces being so arranged that substantially every part of each bearing-roller may be uncovered during the planetary motion thereof with the cage to thereby enable any particles carried by the roller to drop therefrom by gravity into the receptacle.

18. In a roller-bearing, a box, a journal, a series of bearing-rollers interposed between said box and journal and having a planetary motion about said journal in the operation of the bearing, and a refuse-receptacle of greater length in the direction of the longitudinal axis of the journal than the length of the bearing-rollers, said receptacle presenting roller-supports extended from its edges in opposite directions and partially crossing the said receptacle from said opposite edges for the purposes herein set forth.

19. In a roller-bearing, a box, a journal, a rigid traveling cage located within said box and surrounding said journal and provided with a plurality of bearing-rollers sustained and alined in said cage, of a refuse-receptacle provided with supports extended from the opposite sides of said receptacle, the ends of said supports passing each other and having below them a refuse-receiving space.

20. In a roller-bearing, a box, a journal, a rigid traveling cage located within said box and surrounding said journal and provided with a plurality of bearing-rollers sustained in said cage, and a refuse-receptacle, said receptacle having a series of fixed roller-supports each support occupying a position at an angle to the longitudinal center of the journal and partially crossing the same whereby only portions of each bearing-roller in the direction of the length thereof is supported while passing said receptacle, different portions of each roller between its ends being supported while crossing the receptacle, said supports always supporting uniformly the bearing-rollers throughout their passage over said receptacle.

21. In a roller-bearing, a rigid cage having supports made as spindles having their ends shaped other than round, said spindles being locked in the cage by portions carried by said end pieces overlapping the ends of the spindles, and a series of bearing-rollers surrounding said spindles and centered and alined thereby.

22. A rotatable journal having radially-extended cage-controllers, combined with a rigid traveling alining-cage containing a plurality of bearing-rollers, said cage having supports to center and aline said rollers, the cage traveling in the direction of rotation of and with said journal in the space between said cage-controlling surfaces.

23. In a roller-bearing, a rigid cage having supports made as spindles having their ends shaped other than round, said spindles being locked in the cage by integral portions of the end pieces of the cage overlapping the ends of the spindles, and a series of bearing-rollers surrounding said spindles and centered and alined thereby.

24. In a roller-bearing, a rotatable journal provided with a plurality of cage-controllers moving with it, the controller at the end of the journal being detachable therefrom, antifriction-washers surrounding said journal and contacting one with the inner side of each controller, a traveling cage surrounding said journal between said controllers and provided with bearing-rollers, non-rotatable supports carried by said cage and entering the rollers, the rollers rotating about said supports, antifriction means to prevent the contact of said bearing-rollers with said cage or with said supports, said cage being of a length in the direction of the length of its bearing-rollers to run in the space between said washers without contact therewith, said washers striking at times the ends of the cage revolving with the journal and in the same direction, and a suitable box surrounding and inclosing the journal, its controllers and said cage.

25. In a roller-bearing, a rotatable journal provided with a plurality of cage-controllers moving with it, the controller at the end of the journal being detachable therefrom, antifriction-washers surrounding said journal and contacting one with the inner side of each controller, a traveling cage surrounding said journal between said controllers and provided with bearing-rollers, supports carried by said cage and entering the rollers, the rollers rotating about said supports, antifriction means to prevent the contact of said bearing-rollers with said cage or with said supports, said cage being of a length in the direction of the length of its bearing-rollers to run in the space between said washers without contact therewith, said washers striking at times the ends of the cage revolving with the journal and in the same direction, and a suitable box having a refuse-receptacle presenting a cross-support to sustain portions of said rollers while crossing said receptacle, different portions of said rollers being exposed in crossing the receptacle that particles carried by the rollers may descend by gravity and enter said receptacle.

26. In a roller-bearing, a rotatable journal provided with a plurality of cage-controllers moving with it, the controller at the end of the journal being detachable therefrom, antifriction-washers surrounding said journal and contacting one with the inner side of each controller, a traveling cage surrounding said journal between said controllers and provided with bearing-rollers, non-rotatable supports carried by said cage and entering the rollers, the rollers rotating about said supports, antifriction means to prevent the contact of said bearing-rollers with said cage or with said supports, said cage being of a length in the direction of the length of its bearing-rollers to run in the space between said washers without contact therewith, said washers striking at times the ends of the cage revolving with the journal and in the same direction, a suitable box surrounding and inclosing the journal, its controllers and said cage, and end-thrust means having a planetary motion and sustained by said box and meeting at intervals the face of said detachable controller.

27. In a roller-bearing, a cage having its end walls united rigidly by arms, said walls having a series of alined through-holes, a series of non-rotatable supports held in said alined holes, a series of bearing-rollers chambered at their ends and surrounding said supports, a series of balls to prevent the contact of said rollers with either said supports or cage ends, and faster-moving cage-controllers located outside and separated from the ends of and movable with said cage in the same direction and adapted to strike the opposite ends of said cage at intervals and move it into its free-running position.

28. In a roller-bearing, a cage having its end walls united rigidly by arms, said walls having a series of alined through-holes, a series of non-rotatable supports held in said alined holes, a series of bearing-rollers chambered at their ends and surrounding said supports, a series of balls to prevent the contact of said rollers with either said supports or cage ends, faster-moving cage-controllers located outside and separated from the ends of and movable with said cage in the same direction and adapted to strike the opposite ends of said cage at intervals and move it into its free-running position, and antifriction-washers interposed between said cage ends and said controllers and supported at their outer sides by said controllers and traveling with them.

In testimony whereof I have signed my name to this specification in the presence of two subscribing witnesses.

JULIUS A. PERKINS.

Witnesses:
GEO. W. GREGORY,
MARGARET A. DUNN.